(12) United States Patent
Kim

(10) Patent No.: US 11,821,995 B2
(45) Date of Patent: Nov. 21, 2023

(54) VEHICLE POSITION CORRECTION APPARATUS AND METHOD THEREOF

(71) Applicants: HYUNDAI MOTOR COMPANY, Seoul (KR); Kia Corporation, Seoul (KR)

(72) Inventor: Tae Heon Kim, Siheung-si (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 235 days.

(21) Appl. No.: 17/499,122

(22) Filed: Oct. 12, 2021

(65) Prior Publication Data
US 2022/0355805 A1    Nov. 10, 2022

(30) Foreign Application Priority Data

May 4, 2021    (KR) .................. 10-2021-0057978

(51) Int. Cl.
| | |
|---|---|
| *B60W 40/10* | (2012.01) |
| *G01S 19/40* | (2010.01) |
| *G06N 3/02* | (2006.01) |
| *G06F 18/214* | (2023.01) |
| *G01S 19/42* | (2010.01) |
| *G01C 21/30* | (2006.01) |
| *G06N 3/08* | (2023.01) |
| *G08G 1/0968* | (2006.01) |
| *G01C 21/16* | (2006.01) |

(52) U.S. Cl.
CPC ............ *G01S 19/40* (2013.01); *B60W 40/10* (2013.01); *G01C 21/165* (2013.01); *G01C 21/30* (2013.01); *G01S 19/42* (2013.01); *G06F 18/214* (2023.01); *G06N 3/02* (2013.01); *G06N 3/08* (2013.01); *G08G 1/0968* (2013.01); *B60W 2510/0638* (2013.01); *B60W 2552/20* (2020.02); *B60W 2554/4041* (2020.02)

(58) Field of Classification Search
None
See application file for complete search history.

(56) References Cited

U.S. PATENT DOCUMENTS

| | | | |
|---|---|---|---|
| 10,755,580 B2 * | 8/2020 | McQuillen | .............. H04W 4/08 |
| 10,845,806 B2 * | 11/2020 | Chu | ...................... G01S 13/867 |
| 11,092,692 B2 * | 8/2021 | Lee | ......................... G01S 17/89 |

(Continued)

FOREIGN PATENT DOCUMENTS

| | | | | |
|---|---|---|---|---|
| CA | 3158601 A1 * | 5/2021 | ........ | B60W 60/0027 |
| CA | 3166449 A1 * | 9/2021 | ............ | B60W 30/09 |

(Continued)

*Primary Examiner* — Kevin R Steckbauer
(74) *Attorney, Agent, or Firm* — MORGAN, LEWIS & BOCKIUS LLP

(57) ABSTRACT

A vehicle position correction apparatus and a method thereof may include a learner that deep learns a model which predicts a position of a probe vehicle based on driving information of the probe vehicle traveling on a road, a communication device that receives driving information of a target vehicle from the target vehicle, and a controller that obtains a predicted position of the target vehicle based on the model on which the deep learning is completed and corrects an actually measured position of the target vehicle to the predicted position of the target vehicle.

16 Claims, 5 Drawing Sheets

(56) References Cited

U.S. PATENT DOCUMENTS

| | | | |
|---|---|---|---|
| 11,685,403 B2* | 6/2023 | Manivasagam | G06N 3/044 370/329 |
| 2018/0053102 A1* | 2/2018 | Martinson | G08G 1/09623 |
| 2019/0272760 A1* | 9/2019 | McQuillen | G08G 1/163 |
| 2020/0386895 A1* | 12/2020 | Lee | G01C 21/3602 |
| 2021/0146959 A1* | 5/2021 | Manivasagam | H04W 4/46 |
| 2021/0152996 A1* | 5/2021 | Manivasagam | G06N 3/045 |
| 2021/0152997 A1* | 5/2021 | Manivasagam | B60W 60/0027 |
| 2021/0158701 A1* | 5/2021 | Cho | G08G 1/096716 |
| 2022/0355805 A1* | 11/2022 | Kim | G06N 3/02 |

FOREIGN PATENT DOCUMENTS

| | | | | |
|---|---|---|---|---|
| CA | 3052954 | C  * | 4/2023 | B60K 31/00 |
| CN | 102778237 | A  * | 11/2012 | |
| CN | 102741656 | B  * | 4/2016 | G01C 21/005 |
| CN | 107609633 | A  * | 1/2018 | |
| CN | 108871336 | A  * | 11/2018 | G01C 21/005 |
| CN | 108871336 | B  * | 5/2019 | G01C 21/005 |
| CN | 109769285 | A  * | 5/2019 | |
| CN | 110579781 | A  * | 12/2019 | G01S 19/42 |
| CN | 111399021 | A  * | 7/2020 | |
| CN | 111629319 | A  * | 9/2020 | H04W 4/027 |
| CN | 112019997 | A  * | 12/2020 | G01C 21/165 |
| CN | 109769285 | B  * | 5/2021 | |
| CN | 112839855 | A  * | 5/2021 | B60W 50/0097 |
| CN | 113703025 | A  * | 11/2021 | |
| CN | 114061570 | A  * | 2/2022 | |
| CN | 111629319 | B  * | 5/2022 | H04W 4/027 |
| CN | 112839855 | B  * | 7/2022 | B60W 50/0097 |
| CN | 110431037 | B  * | 11/2022 | B60K 31/00 |
| CN | 115308784 | A  * | 11/2022 | B60W 40/10 |
| DE | 102006057998 | A1 * | 3/2008 | G01C 21/165 |
| DE | 112016007345 | T5 * | 6/2019 | G05D 1/0293 |
| DE | 102018212133 | A1 * | 1/2020 | G01C 11/06 |
| EP | 3598163 | A1 * | 1/2020 | G01C 11/06 |
| FR | 2906043 | A1 * | 3/2008 | G01C 21/165 |
| JP | 4190660 | B2 * | 12/2008 | |
| JP | 2011174770 | A  * | 9/2011 | G01C 21/005 |
| JP | 5372802 | B2 * | 12/2013 | G01C 21/005 |
| JP | 2022141538 | A  * | 9/2022 | |
| KR | 10-2005-0039347 | A | 4/2005 | |
| KR | 10-2020-0140527 | A | 12/2020 | |
| SG | 141295 | A1 * | 4/2008 | G01C 21/165 |
| TW | 201020519 | A  * | 6/2010 | G01C 21/30 |
| WO | WO-2011105264 | A1 * | 9/2011 | G01C 21/005 |
| WO | WO-2018093381 | A1 * | 5/2018 | G05D 1/0293 |
| WO | WO-2020139391 | A1 * | 7/2020 | G01C 21/32 |
| WO | WO-2021097391 | A1 * | 5/2021 | B60W 60/0027 |
| WO | WO-2021101054 | A1 * | 5/2021 | G01S 19/07 |
| WO | WO-2021207999 | A1 * | 10/2021 | G01C 21/165 |
| WO | WO-2022141538 | A1 * | 7/2022 | B60W 50/0097 |

* cited by examiner (CONVENTIONAL METHOD)

(METHOD OF PRESENT DISCLOSURE)

VEHICLE POSITION CORRECTION APPARATUS AND METHOD THEREOF

CROSS-REFERENCE TO RELATED APPLICATION

The present application claims priority to Korean Patent Application No. 10-2021-0057978, filed on May 4, 2021, the entire contents of which is incorporated herein for all purposes by this reference.

BACKGROUND OF THE INVENTION

Field of the Invention

The present invention relates to a technique for correcting a position of a vehicle based on deep learning.

Description of Related art

In general, deep learning (or deep neural network) is a type of machine learning, in which a multi-layered artificial neural network (ANN) is configured between an input and an output, and such an artificial neural network may include a convolutional neural network (CNN) or a recurrent neural network (RNN), depending on structures, problems to be solved, and purposes.

Data input to the convolutional neural network may be divided into a training set and a test set. The convolutional neural network learns weights of the neural network through the training set, and identifies the learned result through the test set.

In such a convolutional neural network, when data is input, an operation is conducted step by step from an input layer to a hidden layer, and the result is output. In the present process, the input data passes through all nodes only once.

In the present way, the fact that input data passes through all nodes only once means that it is a structure that does not consider the data order, that is, a temporal aspect. After all, the convolutional neural network performs learning regardless of the temporal order of the input data. In contrast, the recurrent neural network has a structure in which the result of the hidden layer is input to the hidden layer again. This structure means that the temporal order of the input data is considered.

A technique for correcting the position of a vehicle based on such deep learning has not been provided.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a vehicle position correction apparatus and a method thereof configured for improving performance of a system that provides traffic information based on the position information of a target vehicle as well as accurately measuring the position of the target vehicle, by deep learning a model that predicts the position of the probe vehicle based on the driving information of the probe vehicle traveling on a road, obtaining a predicted position of the target vehicle based on the model on which the deep learning is completed, and correcting an actually measured position of the target vehicle to the predicted position of the target vehicle.

The technical problems to be solved as various exemplary embodiments of the present invention are not limited to the aforementioned problems, and any other technical problems not mentioned herein will be clearly understood from the following description by those skilled in the art to which various exemplary embodiments of the present invention pertains. Furthermore, it will be readily apparent that the objects and advantages of the present invention may be realized by the means and combinations thereof indicated in the appended claims.

According to various aspects of the present invention, a vehicle position correction apparatus includes a learner that deep learns a model which predicts a position of a probe vehicle based on driving information of the probe vehicle traveling on a road, a communication device that receives driving information of a target vehicle from the target vehicle, and a controller that obtains a predicted position of the target vehicle based on the model on which the deep learning is completed and corrects an actually measured position of the target vehicle to the predicted position of the target vehicle.

In various exemplary embodiments of the present invention, the learner may perform the deep learning on the model which predicts the position of the probe vehicle, based on the driving information of the probe vehicle driving on a reference section of the road.

In various exemplary embodiments of the present invention, the reference section may be one of an underpass section, an overpass section, and a branch road section of the road.

In various exemplary embodiments of the present invention, the driving information of the probe vehicle may include at least one of position information, speed information, acceleration information, angular speed information, driving line information, and road section information.

In various exemplary embodiments of the present invention, the controller may replace the actually measured position of the target vehicle with the predicted position of the target vehicle.

In various exemplary embodiments of the present invention, the actually measured position of the target vehicle may be position information of the target vehicle among the driving information of the target vehicle.

In various exemplary embodiments of the present invention, the position information may be Global Positioning System (GPS) coordinates.

According to various aspects of the present invention, a vehicle position correction method includes deep learning, by a learner, a model which predicts a position of a probe vehicle based on driving information of the probe vehicle traveling on a road, receiving, by a communication device, driving information of a target vehicle from the target vehicle, and obtaining, by a controller, a predicted position of the target vehicle based on the model on which the deep learning is completed, and correcting an actually measured position of the target vehicle to the predicted position of the target vehicle.

In various exemplary embodiments of the present invention, the deep learning of the model may include performing the deep learning on the model which predicts the position of the probe vehicle, based on the driving information of the probe vehicle driving on a reference section of the road.

In various exemplary embodiments of the present invention, the reference section may be one of an underpass section, an overpass section, and a branch road section of the road.

In various exemplary embodiments of the present invention, the driving information of the probe vehicle may include at least one of position information, speed information, acceleration information, angular speed information, driving line information, and road section information.

In various exemplary embodiments of the present invention, the correcting of the actually measured position may include replacing the actually measured position of the target vehicle with the predicted position of the target vehicle.

In various exemplary embodiments of the present invention, the actually measured position of the target vehicle may be position information of the target vehicle among the driving information of the target vehicle.

In various exemplary embodiments of the present invention, the position information may be Global Positioning System (GPS) coordinates.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
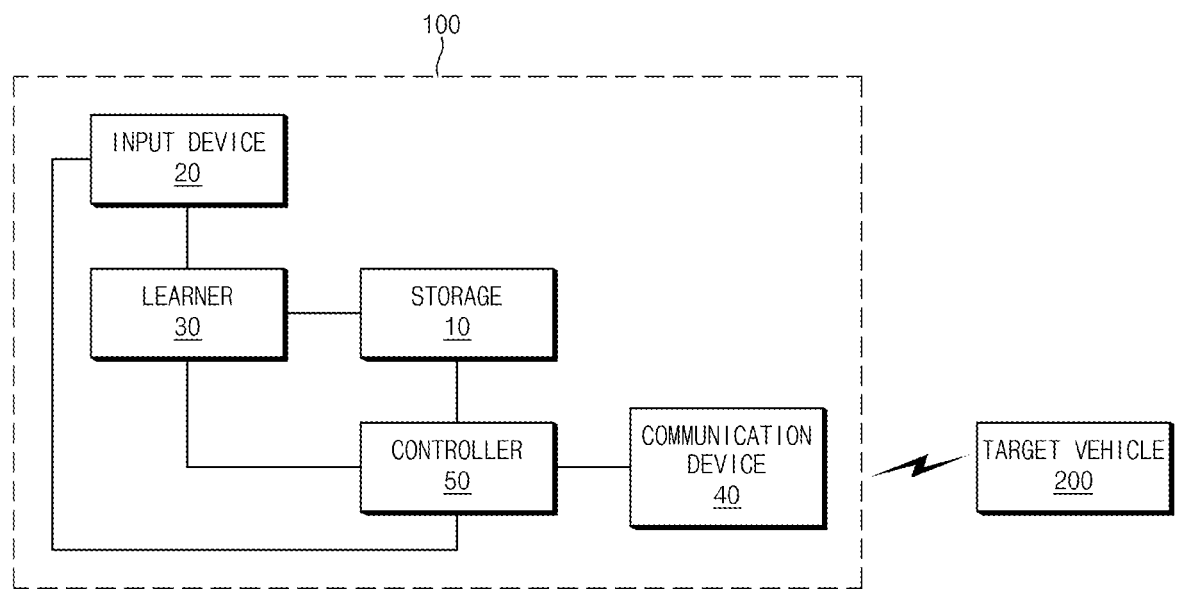
FIG. 1 is a diagram illustrating a vehicle position correction apparatus according to various exemplary embodiments of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, various exemplary embodiments of the present invention will be described in detail with reference to the drawings. In adding the reference numerals to the components of each drawing, it should be noted that the identical or equivalent component is designated by the identical numeral even when they are displayed on other drawings. Furthermore, in describing the exemplary embodiment of the present invention, a detailed description of the related known configuration or function will be omitted when it is determined that it interferes with the understanding of the exemplary embodiment of the present invention.

In describing the components of the exemplary embodiment according to various exemplary embodiments of the present invention, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which the present disclosure belongs. It will be further understood that terms, such as those defined in commonly used dictionaries, should be interpreted as having a meaning which is consistent with their meaning in the context of the relevant art and will not be interpreted in an idealized or overly formal sense unless expressly so defined herein.

FIG. 1 is a diagram illustrating a vehicle position correction apparatus according to various exemplary embodiments of the present invention.

As illustrated in FIG. 1, a vehicle position correction apparatus 100 according to various exemplary embodiments of the present invention may include storage 10, an input device 20, a learner 30, a communication device 40, and a controller 50. In the instant case, each component may be combined with each other to be implemented as one, or some components may be omitted, depending on a manner of implementing the vehicle position correction apparatus 100 according to various exemplary embodiments of the present invention. As an example, the learner 30 may be incorporated into the controller 50 such that the controller 50 performs a function of the learner 30.

Referring to each of the above components, various logics, algorithms, and programs required in a process of deep learning a model that predicts a position of a probe vehicle based on the driving information of the probe vehicle traveling on a road, obtaining the predicted position of a target vehicle based on the model on which the deep learning is completed, and correcting an actually measured position of the target vehicle to the predicted position of the target vehicle, may be stored.

The storage 10 may store various logics, algorithms, and programs required in a process of the deep learning the model that predicts the position of the probe vehicle based on the driving information of the probe vehicle traveling a reference section of a road, obtaining the predicted position of the target vehicle based on the model on which the deep learning is completed, and correcting the actually measured position of the target vehicle to the predicted position of the target vehicle. In the instant case, the reference section of the road is a section in which an error exceeding a threshold value occurs in the actually measured position of the target vehicle, and may include, for example, an underpass section, an overpass section, and a branch road section. Furthermore, the driving information of the probe vehicle may include position information of the probe vehicle, speed information of the probe vehicle, acceleration information of the probe vehicle, angular speed information of the probe vehicle, driving line information of the probe vehicle, driving line information of the probe vehicle, section information (e.g., the underpass section, the overpass section, the branch road section, and the like.) of the road on which the probe vehicle is traveling.

Furthermore, the model may be implemented as an artificial neural network such as a Convolution Neural Network (CNN), a Long Less than a predetermined time period Memory (LSTM), etc., as a deep learning model.

The storage 10 may include at least one type of a storage medium among a memory such as a flash memory, a hard disk, a micro type memory, and a card type memory (e.g., a Secure Digital card (SC card) or an EXtream Digital card (XD card)), and a memory such as a Random Access Memory (RAM), a Static RAM (SRAM), a Read-Only Memory (ROM), a Programmable ROM (PROM), an Electrically Erasable PROM (EEPROM), a magnetic memory (MRAM), a magnetic disk, and an optical disk type memory.

The input device 20 may input the driving information of the probe vehicle traveling on the reference section of the road to the learner 30 as learning data, or may input the driving information of the probe vehicle traveling on the road to the learner 30 as learning data. In the instant case, the learning data may be collected from the probe vehicle. For example, the learning data may include position information of the probe vehicle, velocity information of the probe vehicle, acceleration information of the probe vehicle, angular velocity information of the probe vehicle, driving line information of the probe vehicle, driving line information of the probe vehicle, section information (e.g., the underpass section, the overpass section, the branch road section, and the like.) of the road on which the probe vehicle is traveling.

A gyro sensor, an acceleration sensor, a Light Detection and Ranging (LiDAR) (Light Detection And Ranging) sensor, a camera, a Radio Detecting And Ranging (RaDAR) sensor, a V2X module, a precision map, a Global Positioning System (GPS) receiver, a vehicle network, and the like may be provided to the probe vehicle.

In the instant case, the gyro sensor measures the angular velocity of the probe vehicle. The acceleration sensor measures the acceleration of the probe vehicle. The LiDAR sensor is a type of environmental awareness sensor, which shoots a laser in all directions while rotating and measures the position coordinates of a reflector based on the time it takes to be reflected and returned. The camera captures an image including lines, vehicles, and people around the probe vehicle. The RaDAR sensor is a sensor that receives an electromagnetic wave reflected from an object after the electromagnetic wave is emitted and measures a distance to the object and a direction of the object. The RaDAR sensor may be mounted on the front bumper and the rear side of the probe vehicle, can recognize long-distance objects and is hardly affected by weather. The V2X module may include a Vehicle to Vehicle (V2V) module and a Vehicle to Infrastructure (V2I) module, and the V2V module communicates with one surrounding vehicle to obtain a position, a speed, an acceleration, a yaw rate, and a direction of another surrounding vehicle. The V2I module may obtain a road shape, surrounding structures, and traffic light information (position and lighting state (red, yellow, green, etc.)) from the infrastructure. The precision map is a navigation map, and a precise position of the probe vehicle may be displayed. The GPS receiver receives GPS signals from three or more GPS satellites. The vehicle network is a network for communication between controllers in the probe vehicle, and may include a Controller Area Network (CAN), a Local Interconnect Network (LIN), a FlexRay, a Media Oriented Systems Transport (MOST), an Ethernet, and the like.

The learner 30 may deep learn the model that predicts the position of the probe vehicle based on the driving information of the probe vehicle traveling the reference section of the road, or may deep learn the model that predicts the position of the probe vehicle based on the driving information of the probe vehicle traveling on the road. As an example, the model may have a structure as illustrated in FIG. 2.

Figure 2:
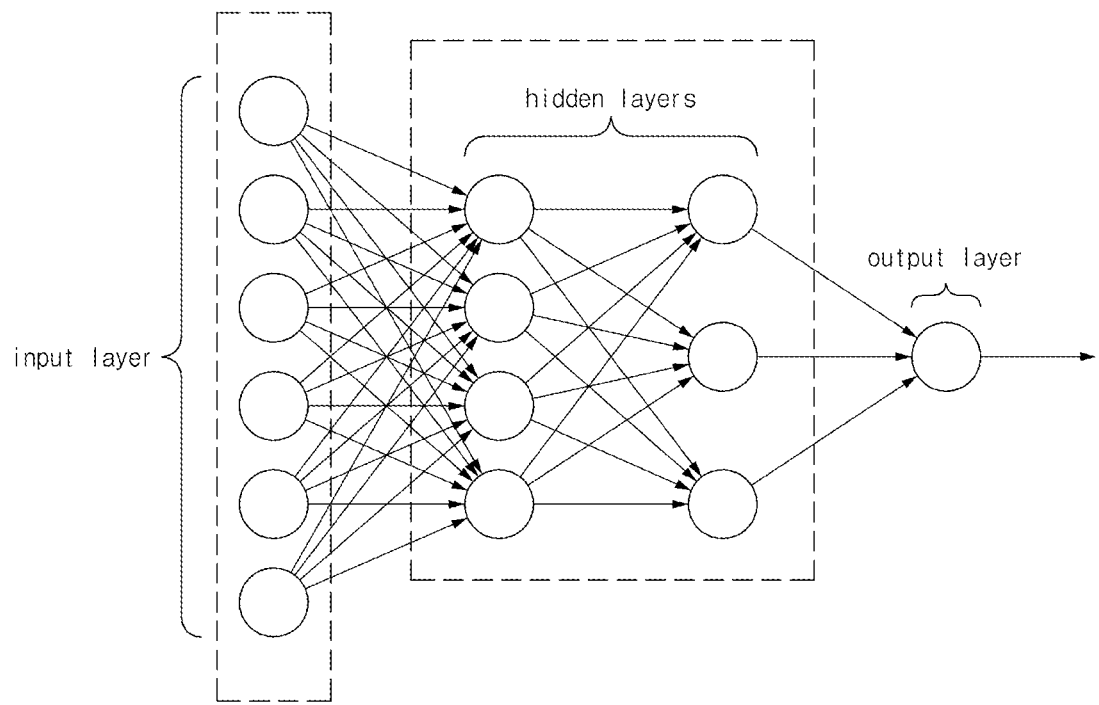
FIG. 2 is a diagram illustrating a model provided in a vehicle position correction apparatus according to various exemplary embodiments of the present invention.

FIG. 2 is a diagram illustrating a model provided in a vehicle position correction apparatus according to various exemplary embodiments of the present invention.

As illustrated in FIG. 2, the model provided in the vehicle position correction apparatus according to various exemplary embodiments of the present invention may include an input layer that receives the driving information of the probe vehicle traveling on the reference section of a road or the driving information of the probe vehicle traveling on a road, a hidden layer that predicts the position of the probe vehicle, and an output layer that outputs the predicted position of the probe vehicle. It is possible to more accurately predict the position of the probe vehicle through the deep learning. In the instant case, an activation function may include a 'relu function' as an example, the number of hidden layers may be '5' as an example, an optimizer may be an 'adam optimizer', and the objective function may include a Mean Square Error (MSE). The learner 30 may store the model on which deep learning is completed in the instant way in the storage 10.

The communication device 40 is a module that provides a communication interface with a target vehicle 200, and may receive the driving information of the target vehicle 200 from the target vehicle 200. In the instant case, the driving information of the target vehicle 200 may include position information, velocity information, acceleration information, angular velocity information, driving line information, section information (e.g., underpass, overpass, branch road, and the like.) of the driving road.

The communication device 40 may include at least one of a mobile communication module, a wireless Internet module, and a short-range communication module to communicate with the probe vehicle.

The mobile communication module may communicate with the probe vehicle through a mobile communication network which is established based on technology standards or communication method (e.g., a GSM (Global System for Mobile communication), a CDMA (Code Division Multi Access), a CDMA2000 (Code Division Multi Access 2000), an EV-DO (Enhanced Voice-Data Optimized or Enhanced Voice-Data Only), a WCDMA (Wideband CDMA), a HSDPA (High Speed Downlink Packet Access), a HSUPA (High Speed Uplink Packet Access), an LTE (Long Term Evolution), an LTEA (Long Term Evolution-Advanced), and the like), a 4G (4th Generation mobile telecommunication), or a 5G (5th Generation mobile telecommunication) for the mobile communication.

The wireless Internet module is a module for wireless Internet access, and may communicate with the probe vehicle through a WLAN (Wireless LAN), a Wi-Fi (Wireless-Fidelity), a Wi-Fi (Wireless Fidelity) Direct, a DLNA (Digital Living Network Alliance), a WiBro (Wireless Broadband), a WiMAX (World Interoperability for Microwave Access), a HSDPA (High Speed Downlink Packet Access), a HSUPA (High Speed Uplink Packet Access), an LTE (Long Term Evolution), or an LTEA (Long Term Evolution-Advanced).

The short-range communication module may support the short range communication by use of at least one of technologies such as a Bluetooth (Bluetooth™), an RFID (Radio Frequency Identification), an IrDA (Infrared Data Association), a UWB (Ultra Wideband), a ZigBee, an NFC (Near Field Communication), and a Wireless USB (Wireless Universal Serial Bus).

The controller 50 may perform overall control such that each of the components can perform their functions normally. The controller 50 may be implemented in a form of hardware, may be implemented in a form of software, or may be implemented in a form of a combination of hardware and software. The controller 50 may be implemented as a microprocessor, but is not limited thereto.

In detail, the controller 50 may perform various controls in a process of the deep learning the model that predicts the position of the probe vehicle based on the driving information of the probe vehicle traveling the reference section of a road, obtaining the predicted position of the target vehicle based on the model on which the deep learning is completed, and correcting an actually measured position of the target vehicle to the predicted position of the target vehicle.

The controller 50 may control the learner 30 to deep learn the model that predicts the position of the probe vehicle based on driving information of the probe vehicle traveling on the reference section of the road.

The controller 50 may control the learner 30 to deep learn the model that predicts the position of the probe vehicle based on driving information of the probe vehicle traveling on the road.

The controller 50 may obtain the predicted position of the target vehicle 200 based on the model on which the deep learning is completed by the learner 30, and may correct the actually measured position of the target vehicle 200 to the predicted position of the target vehicle 200. In detail, the controller 50 may replace the actually measured position of the target vehicle 200 with the predicted position of the target vehicle 200. In the instant case, the actually measured position of the target vehicle 200 may mean position information among the driving information received from the target vehicle 200. Such position information may be, for example, GPS coordinates.

Figure 3:
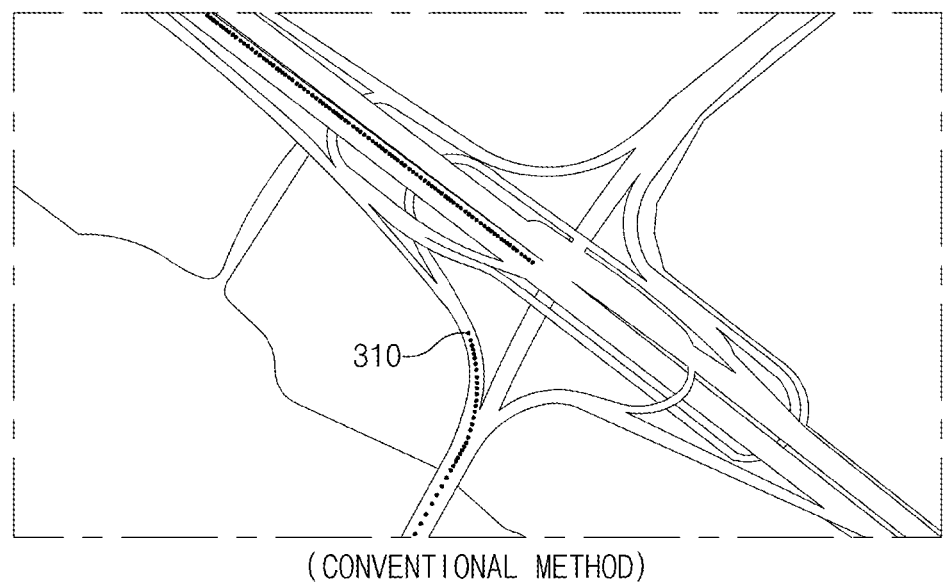
FIG. 3 is a diagram illustrating a performance of a vehicle position correction apparatus according to various exemplary embodiments of the present invention.
Figure 3:
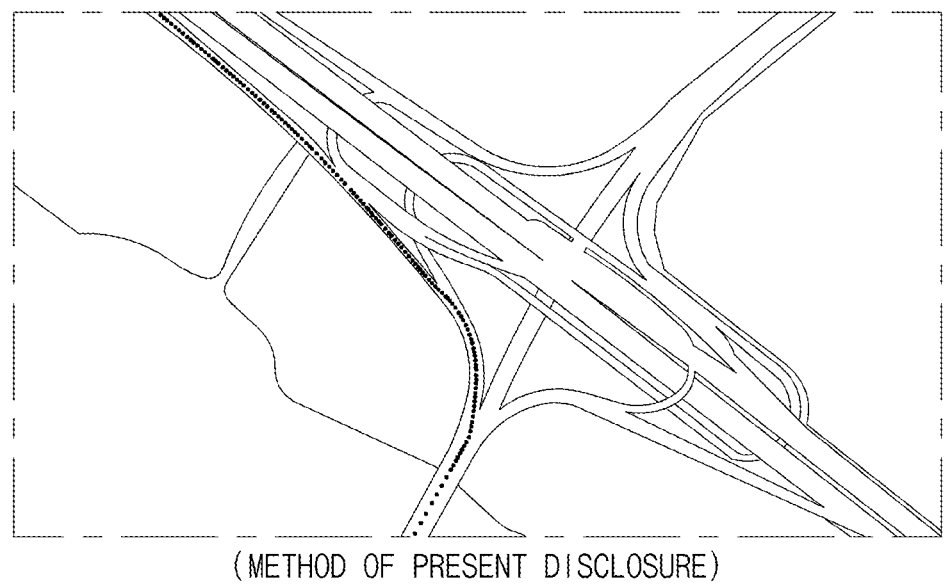

FIG. 3 is a diagram illustrating a performance of a vehicle position correction apparatus according to various exemplary embodiments of the present invention.

As illustrated in FIG. 3, it may be seen that a conventional method does not recognize the entering even though the target vehicle 200 enters the branch road in the branch road section, and may display the position of the target vehicle 200 on the map by accurately recognizing the position of the target vehicle 200 from a point 310 out of an error range of the GPS. As a result, the conventional method may not detect a precise position of the target vehicle 200.

In contrast, it may be seen that a method of the present invention accurately recognizes that the target vehicle 200 has entered the branch road in the branch road section, and may accurately display the position of the target vehicle 200 on the map.

Figure 4:
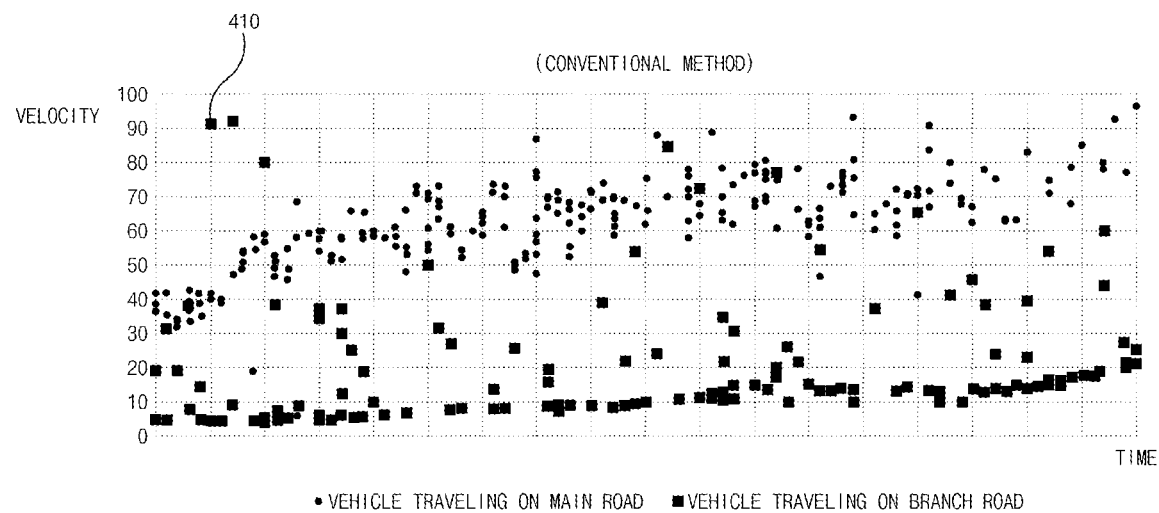
FIG. 4 is a diagram illustrating a performance of a vehicle position correction apparatus according to various exemplary embodiments of the present invention.
Figure 4:
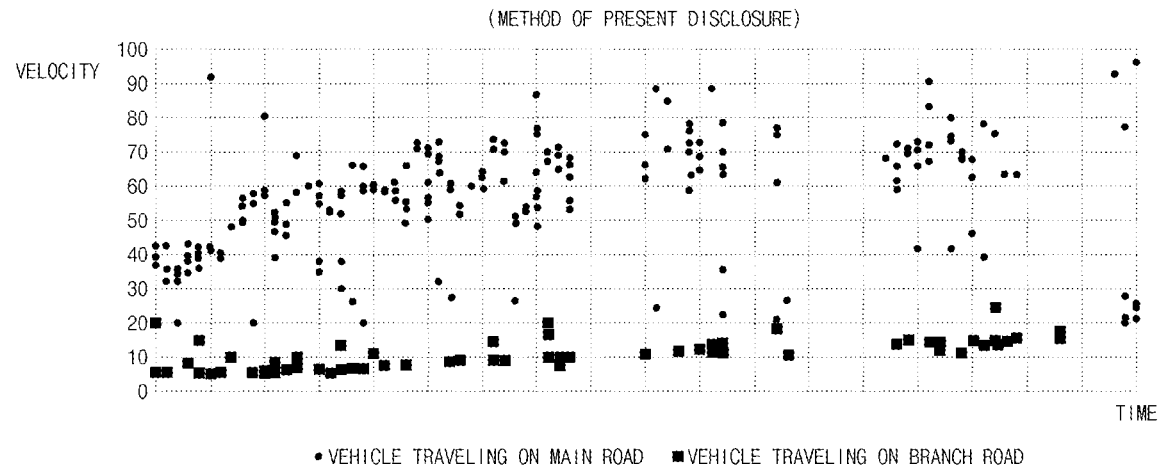

FIG. 4 is a diagram illustrating a performance of a vehicle position correction apparatus according to various exemplary embodiments of the present invention.

As illustrated in FIG. 4, it may be seen that the conventional method recognizes vehicles continuously traveling on the main road as vehicles entering the branch road. For example, the conventional method recognizes a vehicle 410 traveling on the main road at a speed of 90 kph as the vehicle entering the branch road.

In contrast, it may be seen that the method of the present invention distinguishes the vehicle traveling on the main road and the vehicle traveling on the branch road relatively accurately.

Figure 5:
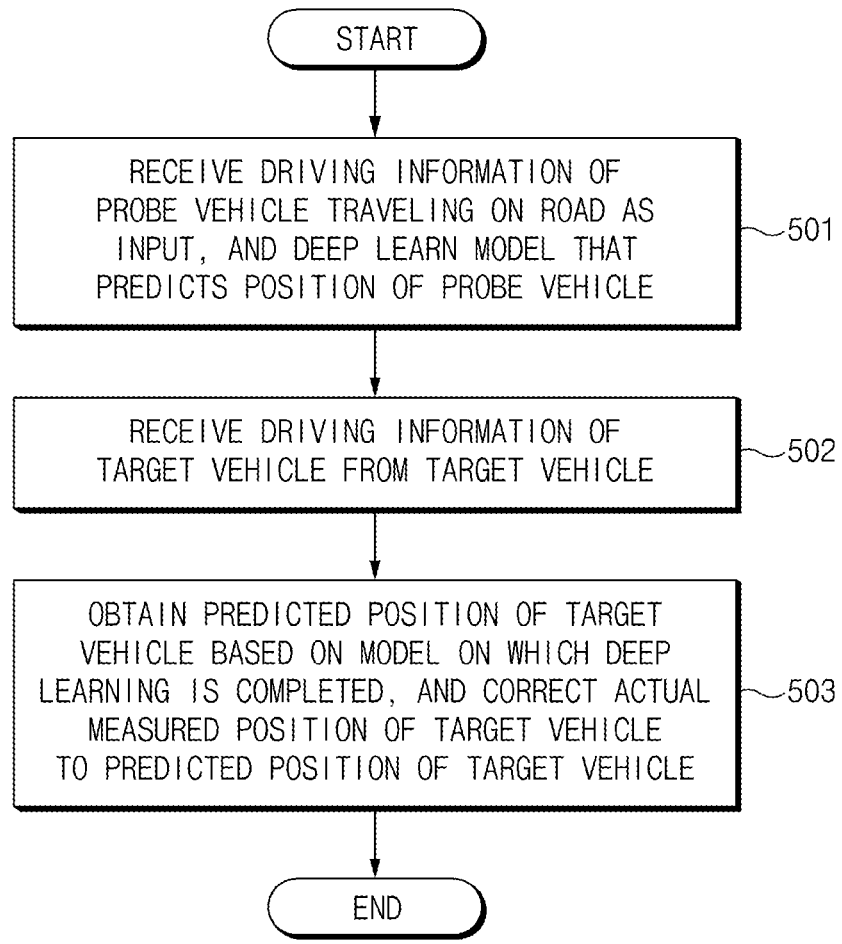
FIG. 5 is a flowchart describing a vehicle position correction method according to various exemplary embodiments of the present invention.

FIG. 5 is a flowchart describing a vehicle position correction method according to various exemplary embodiments of the present invention.

First, the learner 30 receives the driving information of the probe vehicle traveling on the road as an input, and deep learns the model that predicts the position of the probe vehicle (501).

Thereafter, the communication device 40 receives the driving information of the target vehicle 200 from the target vehicle 200 (502).

Thereafter, the controller 50 obtains the predicted position of the target vehicle 200 based on the model on which the deep learning is completed, and corrects the actually measured position of the target vehicle 200 to the predicted position of the target vehicle 200 (503). In the instant case, the controller 50 may replace the measured position of the target vehicle 200 with the predicted position of the target vehicle 200.

According to various exemplary embodiments of the present invention, a vehicle position correction apparatus and a method thereof cannot only accurately measure the position of the target vehicle, but also may improve the performance of a system that provides traffic information based on the position information of a target vehicle, by deep learning a model that predicts the position of the probe vehicle based on the driving information of the probe vehicle traveling on a road, obtaining a predicted position of the target vehicle based on the model on which the deep learning is completed, and correcting an actually measured position of the target vehicle to the predicted position of the target vehicle.

The above description is merely illustrative of the technical idea of the present invention, and those of ordinary skill in the art to which various exemplary embodiments of the present invention pertains will be able to make various modifications and variations without departing from the essential characteristics of the present invention.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A vehicle position correction apparatus comprising:
a learner configured to deep learn a model which predicts a position of a probe vehicle based on driving information of the probe vehicle traveling on a road;
a communication device configured to receive driving information of a target vehicle from the target vehicle; and
a controller configured to obtain a predicted position of the target vehicle based on the model on which the deep learning is completed, and to correct an actually measured position of the target vehicle to the predicted position of the target vehicle.

2. The apparatus of claim 1, wherein the learner is configured to perform the deep learning on the model which predicts the position of the probe vehicle, based on the driving information of the probe vehicle driving on a reference section of the road.

3. The apparatus of claim 2, wherein the reference section is one of an underpass section, an overpass section, and a branch road section of the road.

4. The apparatus of claim 1, wherein the driving information of the probe vehicle includes at least one of position information, speed information, acceleration information, angular speed information, driving line information, and road section information.

5. The apparatus of claim 1, wherein the controller is configured to replace the actually measured position of the target vehicle with the predicted position of the target vehicle.

6. The apparatus of claim 5, wherein the actually measured position of the target vehicle is position information of the target vehicle among the driving information of the target vehicle.

7. The apparatus of claim 6, wherein the position information is Global Positioning System (GPS) coordinates.

8. The apparatus of claim 1, further including:
a storage configured to store algorithms and programs required in a process of the deep learning the model that predicts the position of the probe vehicle based on the driving information of the probe vehicle traveling the road.

9. A vehicle position correction method comprising:
deep learning, by a learner, a model which predicts a position of a probe vehicle based on driving information of the probe vehicle traveling on a road;
receiving, by a communication device, driving information of a target vehicle from the target vehicle; and
obtaining, by a controller, a predicted position of the target vehicle based on the model on which the deep learning is completed, and correcting an actually measured position of the target vehicle to the predicted position of the target vehicle.

10. The method of claim 9, wherein the deep learning of the model includes,
performing the deep learning on the model which predicts the position of the probe vehicle, based on the driving information of the probe vehicle driving on a reference section of the road.

11. The method of claim 10, wherein the reference section is one of an underpass section, an overpass section, and a branch road section of the road.

12. The method of claim 9, wherein the driving information of the probe vehicle includes at least one of position information, speed information, acceleration information, angular speed information, driving line information, and road section information.

13. The method of claim 9, wherein the correcting of the actually measured position includes,
replacing the actually measured position of the target vehicle with the predicted position of the target vehicle.

14. The method of claim 13, wherein the actually measured position of the target vehicle is position information of the target vehicle among the driving information of the target vehicle.

15. The method of claim 14, wherein the position information is Global Positioning System (GPS) coordinates.

16. A non-transitory computer readable storage medium on which a program for performing the method of claim 9 is recorded.

* * * * *